(12) United States Patent
Minami (10) Patent No.: US 8,303,118 B2
(45) Date of Patent: Nov. 6, 2012

(54) VIDEO PROJECTOR

(75) Inventor: Kazuya Minami, Hirakata (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 327 days.

(21) Appl. No.: 12/552,703

(22) Filed: Sep. 2, 2009

(65) Prior Publication Data
US 2010/0060858 A1 Mar. 11, 2010

(30) Foreign Application Priority Data

Sep. 5, 2008 (JP) ................................. 2008-228457

(51) Int. Cl.
*G03B 21/16* (2006.01)
(52) U.S. Cl. ................ 353/52; 353/57; 353/58; 353/60; 353/61; 353/119; 353/20; 353/31; 353/98
(58) Field of Classification Search ................... 353/52, 353/57, 58, 60, 61, 119, 31, 33, 34, 37; 349/5, 349/7, 8, 9; 362/373, 294, 345; 359/820
See application file for complete search history.

(56) References Cited

U.S. PATENT DOCUMENTS

| | | | |
|---|---|---|---|
| 6,657,680 B2 * | 12/2003 | Takizawa | 349/5 |
| 6,824,273 B2 * | 11/2004 | Konuma et al. | 353/61 |
| 6,832,837 B2 * | 12/2004 | Suzuki et al. | 353/61 |
| 6,906,840 B1 * | 6/2005 | Fujimori et al. | 359/237 |
| 7,232,225 B2 * | 6/2007 | Shiraishi | 353/57 |
| 7,866,828 B2 * | 1/2011 | Nakagawa et al. | 353/58 |
| 2003/0107897 A1 * | 6/2003 | Chou et al. | 362/373 |
| 2004/0223237 A1 * | 11/2004 | Yanagisawa et al. | 359/820 |
| 2005/0213123 A1 * | 9/2005 | Kobayashi | 358/1.9 |
| 2008/0055570 A1 * | 3/2008 | Kong et al. | 353/100 |
| 2008/0198336 A1 * | 8/2008 | Chen et al. | 353/58 |

FOREIGN PATENT DOCUMENTS

JP 2007-298890 A 11/2007

* cited by examiner

*Primary Examiner* — Georgia Y Epps
*Assistant Examiner* — Sultan Chowdhury
(74) *Attorney, Agent, or Firm* — Westerman, Hattori, Daniels & Adrian, LLP (57) ABSTRACT

A video projector includes a first discharge port from which a cooling current is sent out of a duct to an optical component. A cooling fan generates the cooling current which flows through the duct. The first discharge port includes first and second wall surfaces opposed to each other in an optical axis direction in which the light is transmitted through the optical component, third and fourth wall surfaces opposed to each other in a lateral direction perpendicular to the optical axis direction, a discharge port inlet into which the cooling current from the cooling fan is drawn, and a discharge port outlet from which the cooling current is sent toward the optical component. A gap between the first and second wall surfaces and a gap between the third and fourth wall surfaces become narrower from the discharge port inlet to the discharge port outlet.

8 Claims, 12 Drawing Sheets

VIDEO PROJECTOR

CROSS-REFERENCE TO RELATED APPLICATIONS

This application is based upon and claims the benefit of priority from prior Japanese Patent Application No. 2008-228457, filed on Sep. 5, 2008, the entire contents of which are incorporated herein by reference.

BACKGROUND OF THE INVENTION

The present invention relates to a video projector which projects and displays an image and which includes an optical component for transmitting light to show an image, a cooling fan for generating a cooling current to cool the optical component, and a duct for circulating the cooling current.

Generally, a video projector such as a liquid crystal display projector includes optical components for transmitting light to show an image, a cooling fan for generating a cooling current of air to cool the optical components and prevent the durability of the optical components from being shortened, and a duct for circulating the cooling current. The duct has a discharge port from which the cooling current is sent out toward the optical components.

Due to the increase in the brightness of light that passes through the optical components, the amount of heat generated from the optical components has a tendency to increase. Thus, various measures have been taken to effectively cool such optical components. To effectively cool the optical components, for example, a cooling fan, which generates a high static pressure and increases the air current, may be used. However, a cooling fan would increase noise.

Accordingly, Japanese Laid-Open Patent Publication No. 2007-298890 describes the shape of a discharge port that effectively cools optical components.

However, due to the further increase in the brightness of the light transmitted through optical components and the increase in the quantity of optical components, the optical components cannot be sufficiently cooled even when the discharge port of a duct is formed with the shape described in the above publication.

SUMMARY OF THE INVENTION

The present invention relates to a video projector which effectively cools an optical component.

One aspect of the present invention is a video projector including an optical component which transmits light to display an image. A cooling fan generates a cooling current to cool the optical component. The cooling current circulates through a duct, which includes a first discharge port. The first discharge port includes first and second wall surfaces opposed to each other in an optical axis direction in which the light is transmitted through the optical component. Third and fourth wall surfaces are opposed to each other in a lateral direction which is perpendicular to the optical axis direction. The cooling current from the cooling fan is drawn into a discharge port inlet. The cooling current is sent toward the optical component from a discharge port outlet. The first and second wall surfaces are spaced apart by a gap and the third and fourth wall surfaces are spaced apart by a gap, with the gaps becoming narrower from the discharge port inlet to the discharge port outlet.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

A video projector according to the present invention embodied in a liquid crystal display projector will now be discussed with reference to the drawings. The video projector according to the present invention is a liquid crystal display (LCD) projector that projects light onto a screen arranged in front of the projector to display an image and uses liquid crystal as a light valve.

Figure 1:
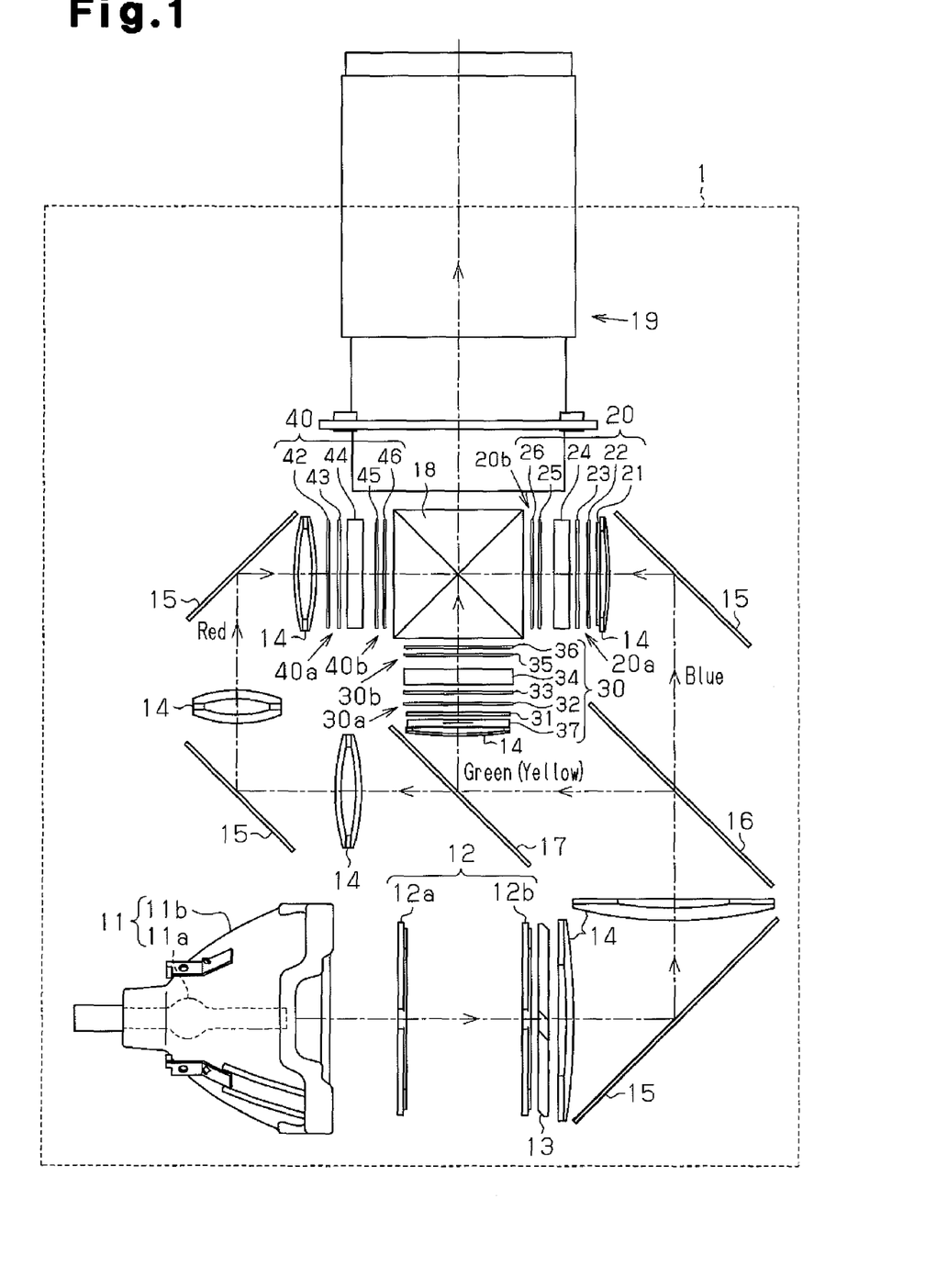
FIG. 1 is a schematic diagram showing optical components included in a liquid crystal display projector, which is one embodiment of a video projector.

Referring to FIG. 1, the LCD projector 1 includes a lamp 11, an integrator lens 12, a polarization conversion element 13, a plurality of condenser lenses 14, a plurality of mirrors 15, dichroic mirrors 16 and 17, liquid crystal light valves 20, 30, and 40, a dichroic prism 18, and a projection lens 19. These optical components will now be discussed in detail.

The lamp 11, which emits light, is a super high pressure mercury lamp that seals a mixture of mercury and halogen gas or a mixture of mercury and halogenide in an arc tube 11a formed from silica glass. A reflector 11b encompasses the arc tube 11a so that light is emitted in only a predetermined direction from the lamp 11.

The integrator lens 12 includes two fly-eye lenses 12a and 12b, which are formed from heat resistant glass. The illuminance of the light emitted from the lamp 11 is equally distributed when passing through the integrator lens 12.

The polarization conversion element 13 includes a polarization separation film and a phase difference plate, and converts the light emitted from the lamp 11 to a linear polarized light. Specifically, the polarization conversion element 13 includes a polarization separation film, which separates light into P polarized light and S polarized light, and a phase difference plate, which shifts the phase of either the P polarized light or the S polarized light. This converts the light entering the liquid crystal light valves 20, 30, and 40 into a linear polarized light.

The condenser lenses 14 each gather the light emitted from the lamp 11 in accordance with the size of the optical component through which the light passes. The mirrors 15 reflect the light emitted from the lamp 11 to guide the light to the liquid crystal light valves 20, 30, and 40, the dichroic prism 18, and the projection lens 19.

The dichroic mirror 16 reflects light having a wavelength corresponding to red and green. The dichroic mirror 17 reflects light having a wavelength corresponding to green. Accordingly, from the white light emitted from the lamp 11, the dichroic mirror 16 separates light having a wavelength corresponding to blue (hereinafter referred to as the "blue light"), and the dichroic mirror 17 separates light having a wavelength corresponding to red (hereinafter referred to as the "red light") and light having a wavelength corresponding to green (hereinafter referred to as the "green light").

The liquid crystal light valve 20 includes an inorganic polarization plate 21, an incident polarization plate 22, an optical compensation plate 23, a liquid crystal panel 24, a pre-polarization plate 25, and an emission polarization plate 26. Further, the liquid crystal light valve 20 transmits the blue light to generate a blue image. The inorganic polarization plate 21, the incident polarization plate 22, the optical compensation plate 23, the liquid crystal panel 24, the pre-polarization plate 25, and the emission polarization plate 26 are arranged in order in the direction in which light enters the liquid crystal light valve 20. The inorganic polarization plate 21, the incident polarization plate 22, and the optical compensation plate 23 function as incident side optical elements 20a arranged at the side of the liquid crystal panel 24 that light enters. The pre-polarization plate 25 and the emission polarization plate 26 function as emission side optical elements 20b arranged at the side of the liquid crystal panel 24 that light exits.

The liquid crystal light valve 30 includes an inorganic polarization plate 31, an incident polarization plate 32, an optical compensation plate 33, a liquid crystal panel 34, a pre-polarization plate 35, an emission polarization plate 36, and a Ye modulation element 37. Further, the liquid crystal light valve 30 transmits the green light to generate a green image. The Ye modulation element 37, the inorganic polarization plate 31, the incident polarization plate 32, the optical compensation plate 33, the liquid crystal panel 34, the pre-polarization plate 35, and the emission polarization plate 36, and are arranged in order in the direction in which light enters the liquid crystal light valve 30. The inorganic polarization plate 31, the incident polarization plate 32, the optical compensation plate 33, and the Ye modulation element 37 function as an incident side optical elements 30a arranged at the side of the liquid crystal panel 34 that light enters. The pre-polarization plate 35 and the emission polarization plate 36 function as an emission side optical elements 30b arranged at the side of the liquid crystal panel 34 that light exits.

The liquid crystal light valve 40 includes an incident polarization plate 42, an optical compensation plate 43, a liquid crystal panel 44, a pre-polarization plate 45, and an emission polarization plate 46. Further, the liquid crystal light valve 40 transmits the red light to generate a red image. The incident polarization plate 42, the optical compensation plate 43, the liquid crystal panel 44, the pre-polarization plate 45, and the emission polarization plate 46 are arranged in order in the direction in which light enters the liquid crystal light valve 40. The incident polarization plate 42 and the optical compensation plate 43 function as an incident side optical elements 40a arranged at the side of the liquid crystal panel 44 that light enters. The pre-polarization plate 45 and the emission polarization plate 46 function as an emission side optical elements 40b arranged at the side of the liquid crystal panel 44 that light exits.

The inorganic polarization plates 21 and 31 are reflective polarization plates that emit the incident polarized light as linear polarized light. Further, the incident polarization plates 22, 32, and 42 are absorptive polarization plates that absorb unnecessary reflection light that is reflected and thus not transmitted through the optical compensation plates 23, 33, and 43 and the liquid crystal panes 24, 34, and 44. The optical compensation plates 23, 33, and 43 compensate for the birefringence of the light transmitted through the liquid crystal panels 24, 34, and 44.

The liquid crystal panels 24, 34, and 44 each include liquid crystal, a transparent electrode for applying voltage to the liquid crystal, and glass for holding the liquid crystal. The pre-polarization plates 25, 35, and 45 decreases the amount of light to reduce the load applied to the emission polarization plates 26, 36, and 46. Further, to improve the contrast of an image, the emission polarization plates 26, 36, and 46 absorb the light randomly reflected between the liquid crystal panels 24, 34, and 44 and the corresponding emission polarization plates 26, 36, and 46. The emission polarization plates 26, 36, and 46 absorb unnecessary reflection light that is reflected and thus not transmitted through the dichroic prism 18.

The Ye modulation element 37 is an adjustment element that modulates the light having a wavelength corresponding to yellow (hereinafter referred to as the "yellow light"), which is included in the green light, in accordance with the voltage applied to the Ye modulation element 37 to adjust the polarization state of the yellow light entering the Ye modulation element 37. More specifically, with regard to the green light that has a predetermined wavelength range so that it is transmitted through the liquid crystal light valve 30, the Ye modulation element 37 modulates the polarization state of the yellow light, which is included in the wavelength range of the green light and has a wavelength range narrower than that of the green light, in accordance with the applied voltage. In one example, a Ye modulation element is an optical element that rotates and emits the linear polarized light of the incident yellow light within a range of 0 to 90 degrees about the optical axis or an optical element that converts the linear polarized light of the incident yellow light to elliptical polarized light or circular polarized light. The LCD projector 1 includes such a Ye modulation element to display an image having a high color reproducibility while preventing the quantity of optical components from increasing and thereby keeping costs low.

The dichroic prism 18 generates a full-color image by combining the blue, green, and red images generated by the liquid crystal light valves 20, 30, and 40. Specifically, from the lights of the three colors that pass through the liquid crystal light valves 20, 30, and 40, the dichroic prism 18 reflects and emits the blue light and red light toward the front of the LCD projector 1. Further, the dichroic prism 18 transmits and emits green light toward the front of the projector 1.

The projection lens 19 includes a plurality of lenses. The light emitted from the dichroic prism 18 enters the projection lens 19. Then, the projection lens 19 emits the light towards the front of the LCD projector 1 to project and display a full-color image.

The optical components described above are attached to and supported by a support in the LCD projector 1. More specifically, referring to FIGS. 2 and 3, the integrator lens 12, the polarization conversion element 13, the condenser lens 14, the mirrors 15, and the dichroic mirrors 16 and 17 are attached to a resin base 51. The incident polarization plates 22, 32, and 42 and the optical compensation plates 23, 33, and 43 are attached to the base 51 by holders 52.

Figure 4:
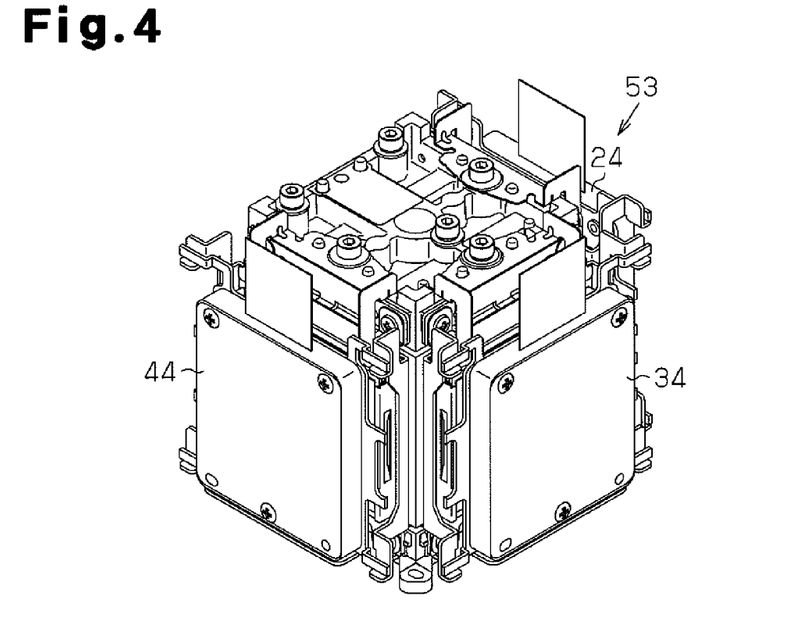
FIG. 4 is a perspective view showing a prism unit in one embodiment.

The liquid crystal panels 24, 34, and 44, the pre-polarization plates 25, 35, and 45, the emission polarization plates 26, 36, and 46, and the dichroic prism 18 are fastened together by screws or the like. In this manner, the optical components that are fastened together with the dichroic prism are formed integrally as a prism unit 53 as shown in FIGS. 2 and 4.

Figure 2:
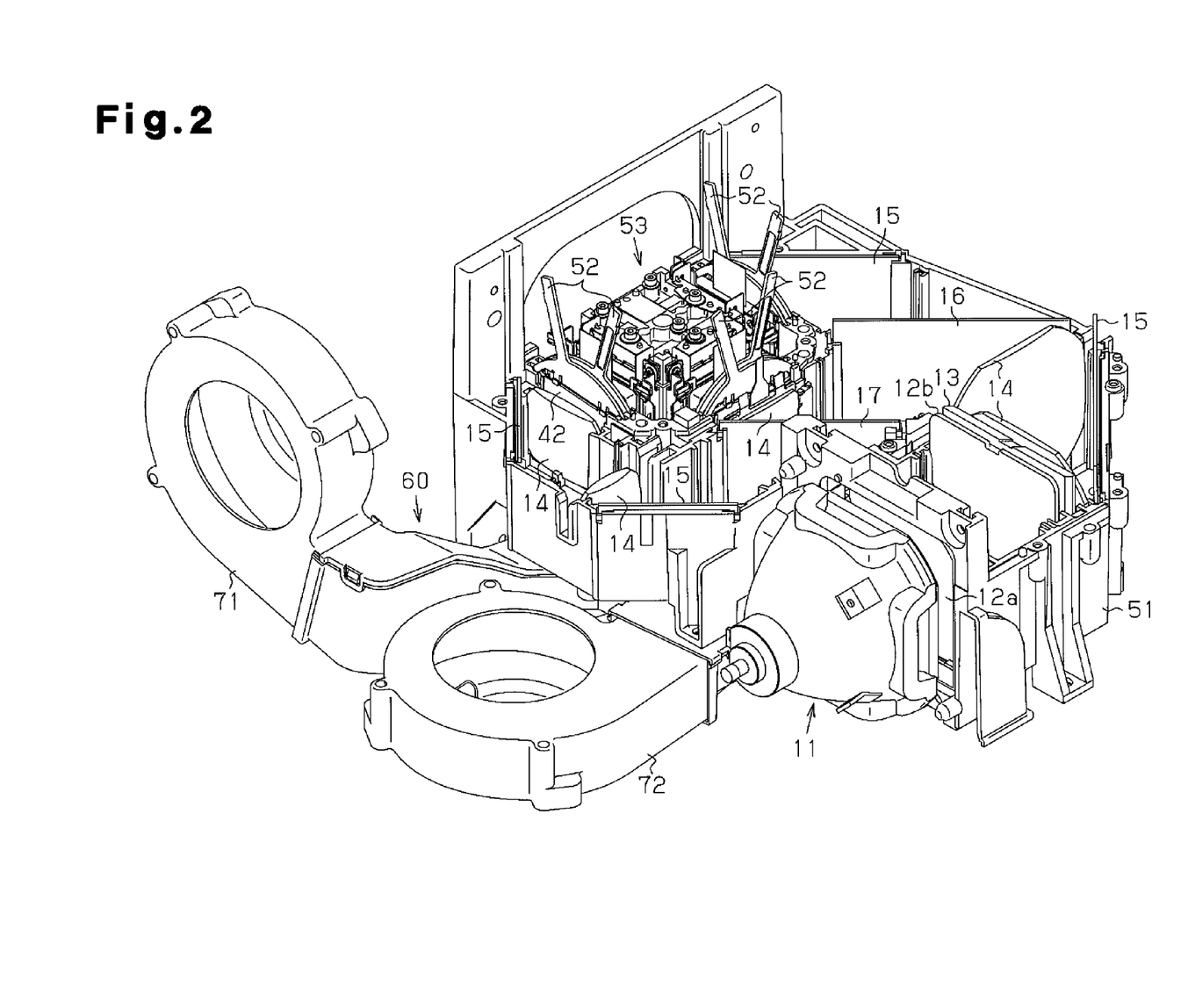
FIG. 2 is a perspective view showing a support for supporting the optical components, a duct for circulating a cooling current of air to cool the optical component, and a cooling fan connected to the duct.
Figure 3:
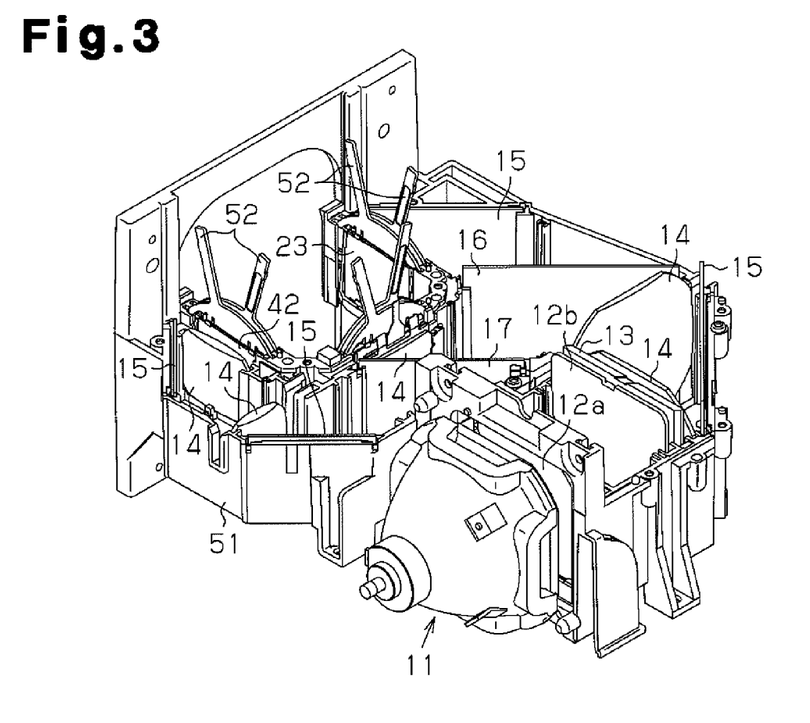
FIG. 3 is a perspective view showing the optical components of FIG. 1 and a base for supporting the optical components.
Figure 5:
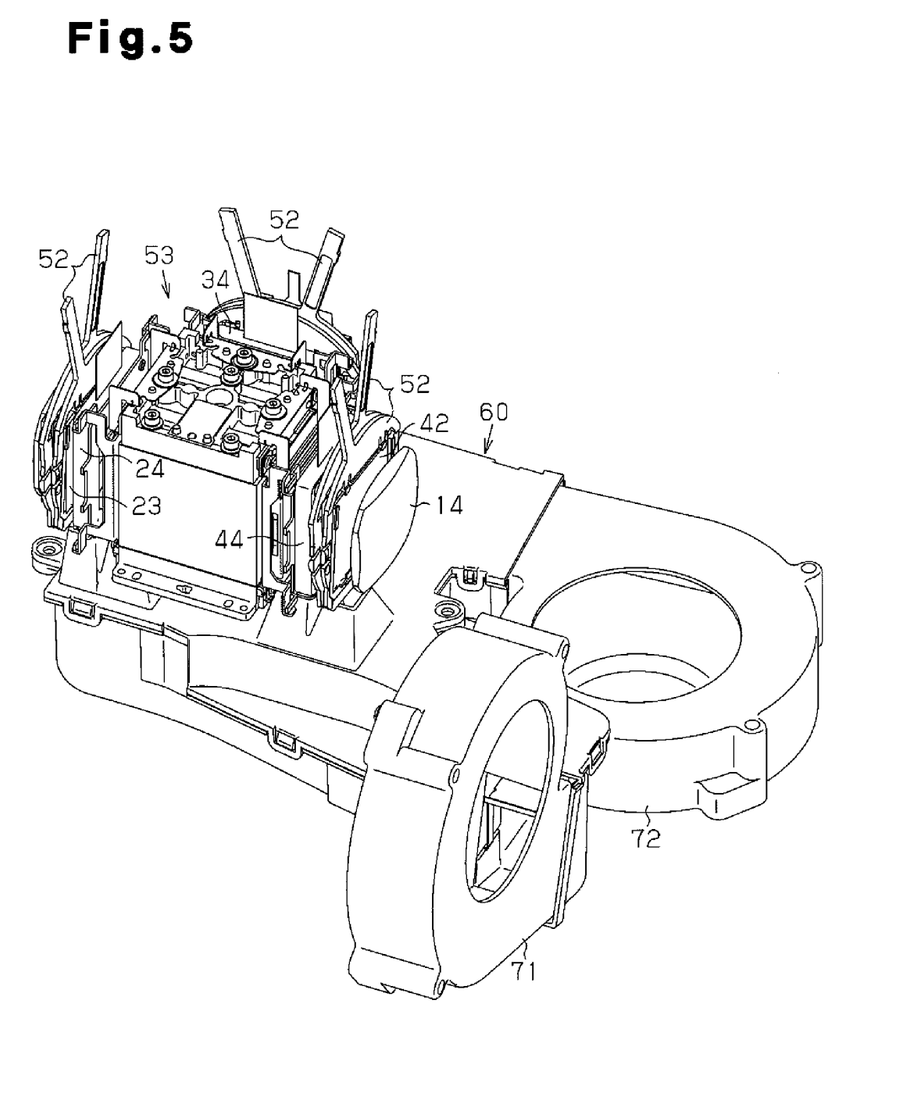
FIG. 5 is a perspective view showing the optical components of FIG. 1, a duct arranged adjacent to the optical components, and the cooling fan.

Referring to FIGS. 2 and 5, a resin duct 60 is arranged near the base 51 and the prism unit 53. Cooling fans 71 and 72, which are for generating a cooling current of air to cool the optical components, are connected to the duct 60, through which the cooling current is guided to the optical components. The cooling fans 71 and 72 include vanes that are not shown in the drawings. The structure of the duct 60 to which the cooling fans 71 and 72 are connected will now be discussed in detail.

Figure 6:
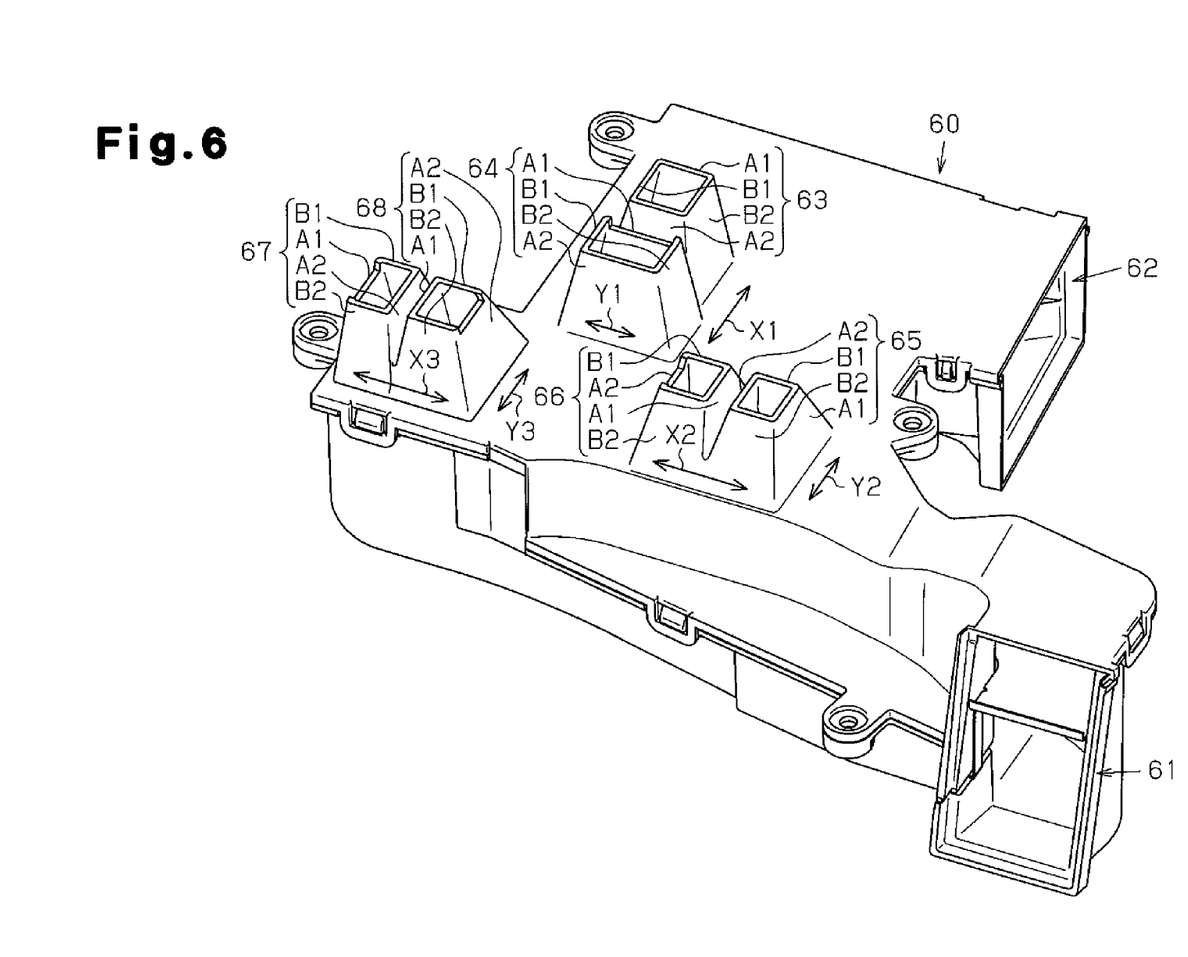
FIG. 6 is a perspective view showing the outer appearance of the duct in one embodiment.
Figure 7:
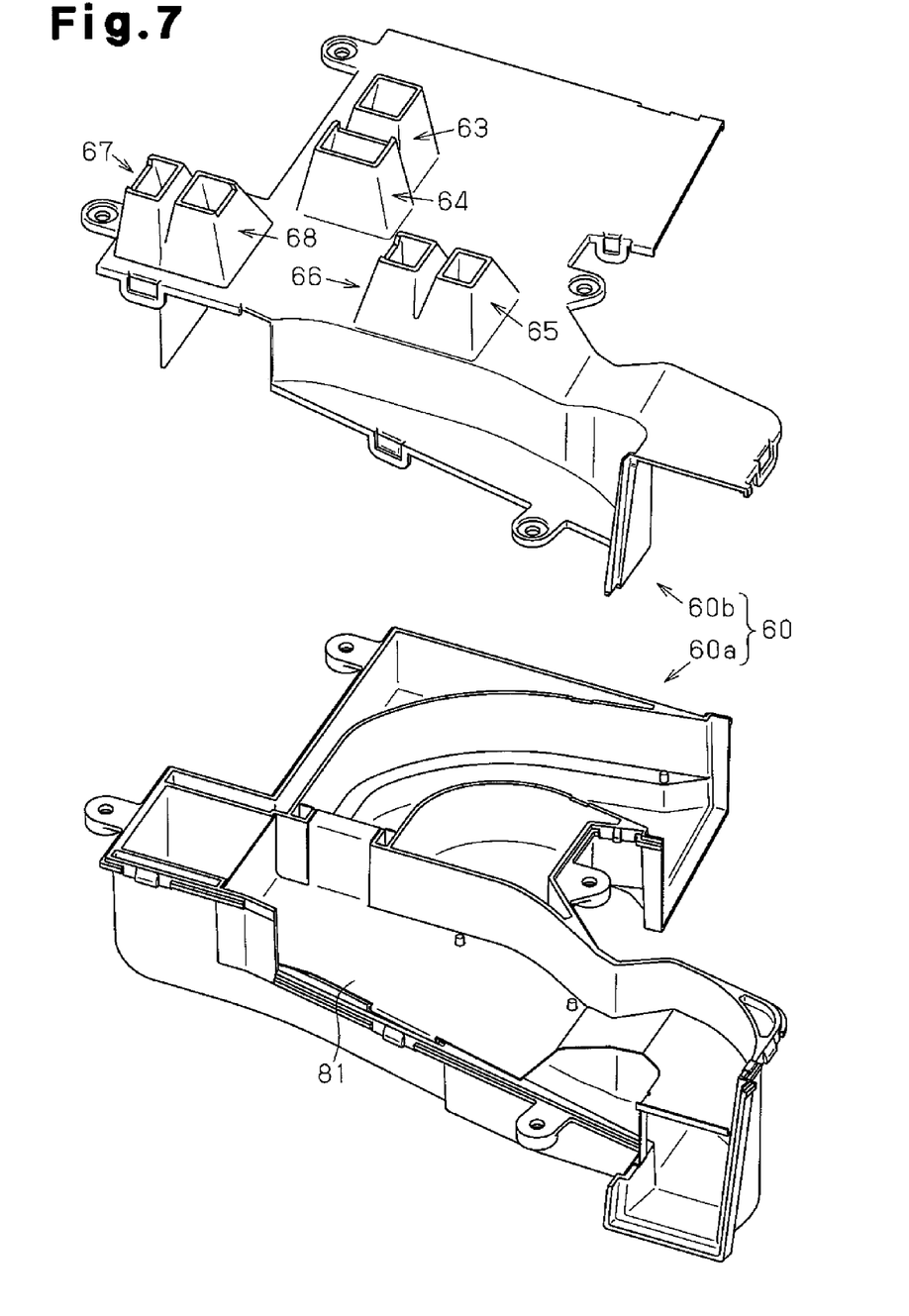
FIG. 7 is an exploded perspective view showing the duct of FIG. 6.
Figure 8:
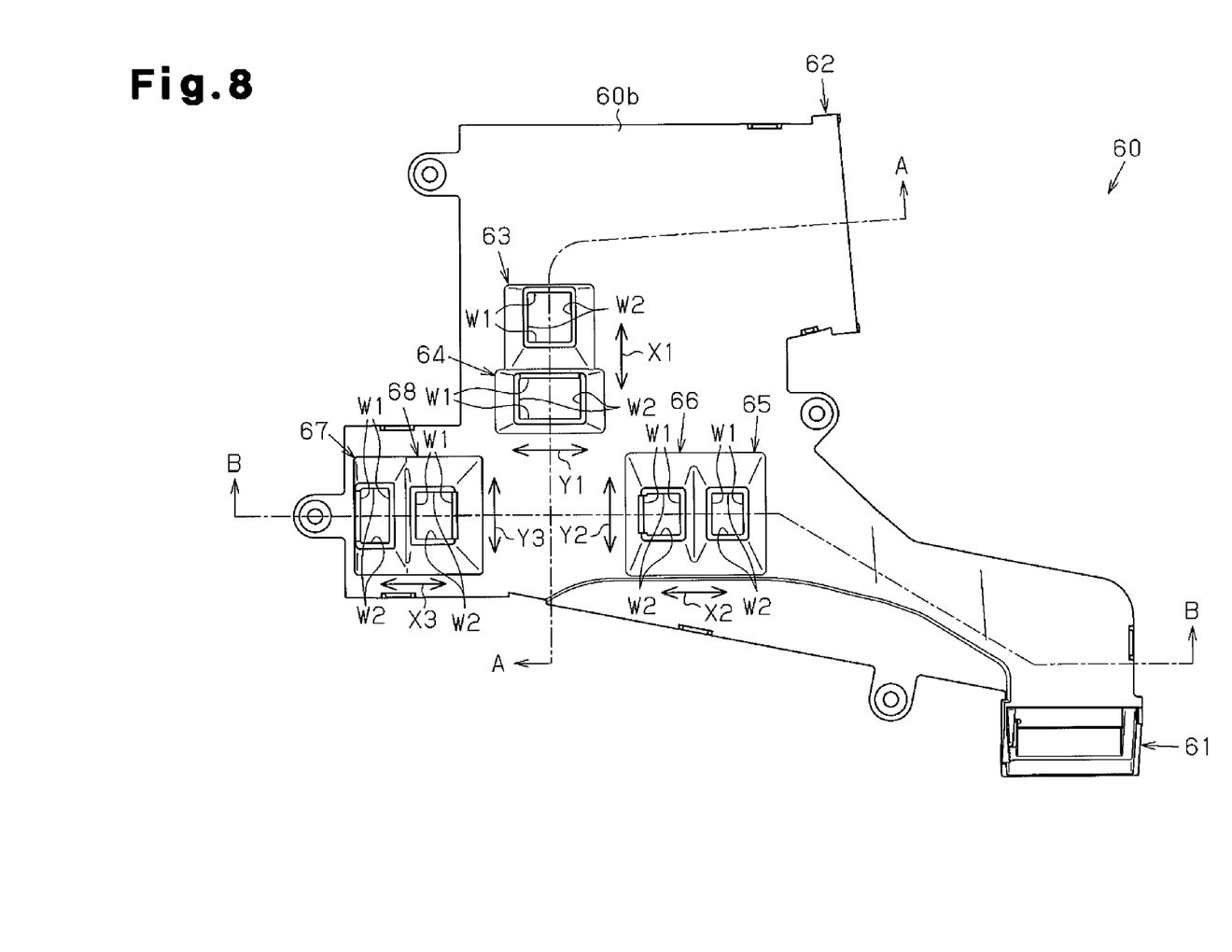
FIG. 8 is a plan view showing the duct of FIG. 6.
Figure 9:
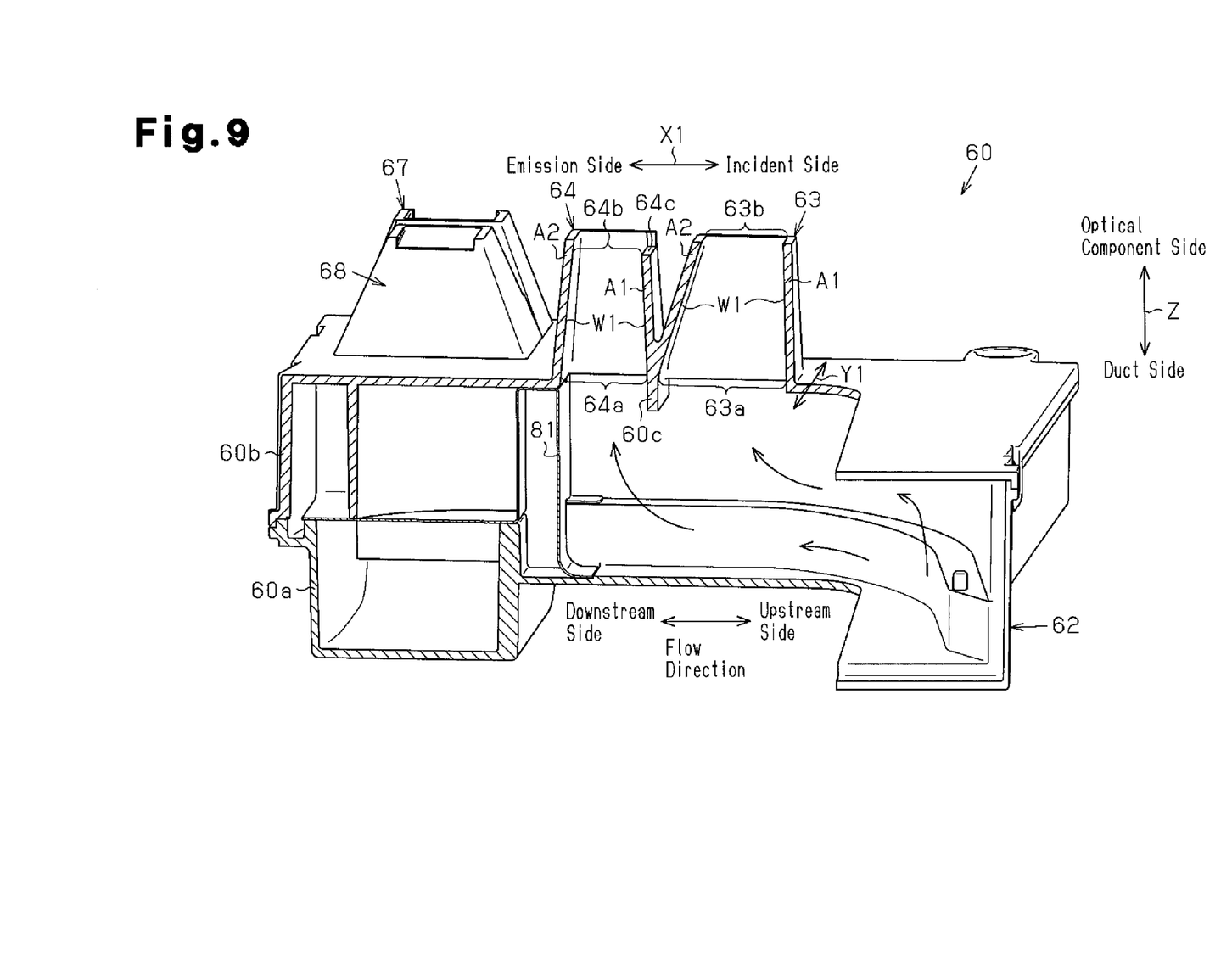
FIG. 9 is a perspective view showing a cross-section taken along line A-A in FIG. 8.
Figure 10:
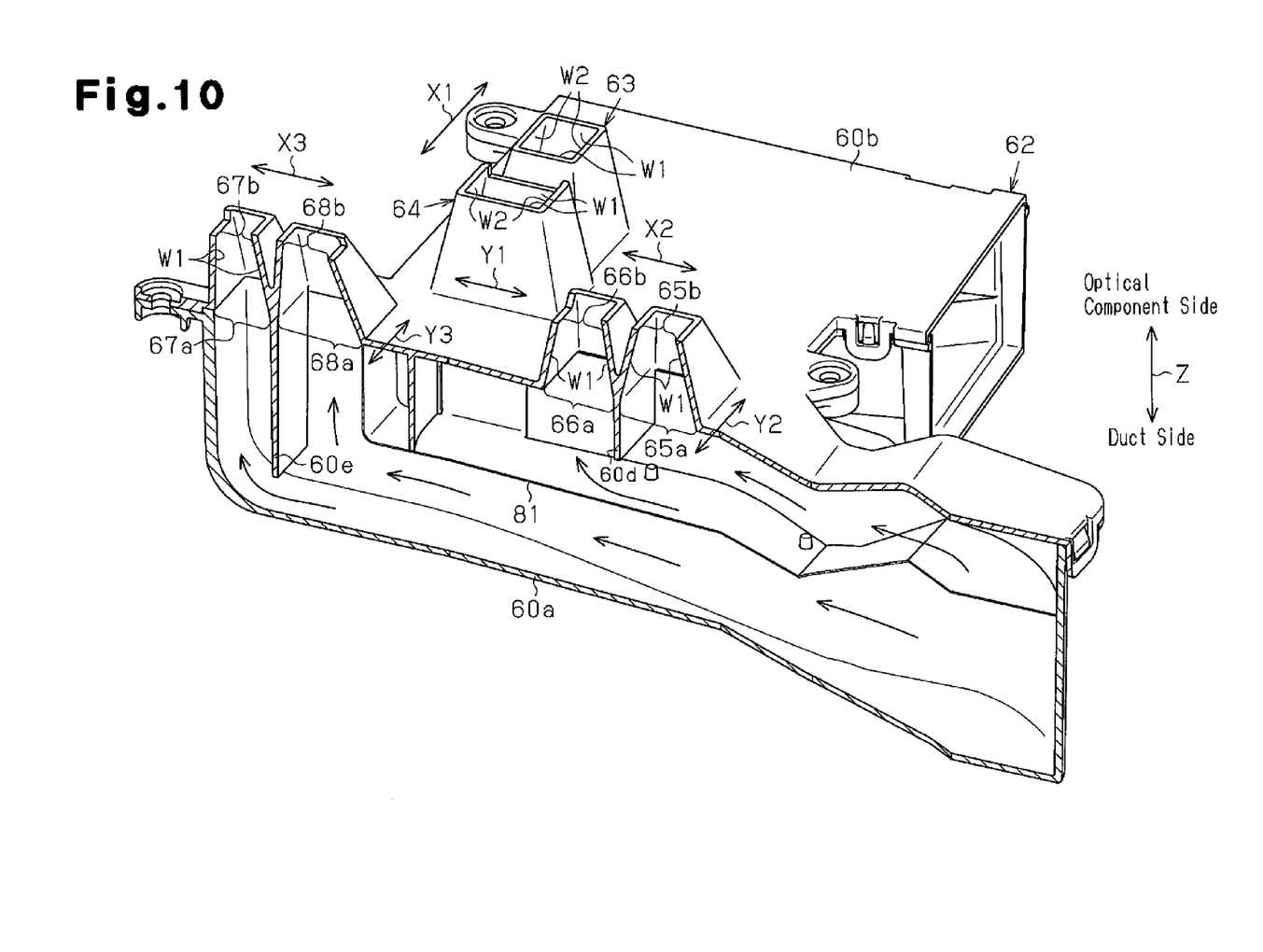
FIG. 10 is a perspective view showing a cross-section taken along line B-B in FIG. 8.

FIG. 6 is a perspective view showing the outer appearance of the duct 60, FIG. 7 is an exploded perspective view showing the duct 60, and FIG. 8 is a plan view showing the duct 60. Further, FIG. 9 is a perspective view showing a cross-section of the duct 60 taken along line A-A in FIG. 8, and FIG. 10 is a perspective showing a cross-section of the duct 60 taken along line B-B in FIG. 8.

Referring to FIG. 6, the duct 60 includes intake ports 61 and 62, into which the cooling currents generated by the cooling fans 71 and 72 enter, and discharge ports 63 to 68, from which the cooling currents are sent out toward the optical components. As shown in FIG. 8, the discharge ports 63 to 68 each include opposing wall surfaces W1 and opposing wall surfaces W2. Referring to FIG. 7, the duct 60 is formed from two duct members 60a and 60b. Further, a metal partition plate 81 is arranged in the duct 60 to form a passage for the cooling current.

The intake ports 61 and 62 of the duct 60 are formed by a wall to which the cooling fans 71 and 72 are connected. Referring to FIGS. 2 and 5, the cooling fan 71 is connected to the intake port 61, and the cooling fan 72 is connected to the intake port 62.

Referring to FIG. 6, the discharge port 63 of the duct 60 is formed by two walls A1 and A2, which are spaced apart and opposed to each other in an optical axis direction X1, and two walls B1 and B2, which connect the walls A1 and A2 and are opposed to each other in a lateral direction Y1. The optical axis direction X1 is the direction in which light is transmitted through the liquid crystal light valve 30, which is the optical component subject to which the air current is sent from the discharge ports 63 and 64. The lateral direction Y1 is perpendicular to the optical axis direction X1 and direction Z (refer to FIGS. 9 to 12) in which the cooling current circulates at the discharge ports 63 and 64.

Referring to FIG. 9, the discharge port 63 includes a discharge port inlet 63a, through which the cooling current from the cooling fan 72 is drawn in when entering the discharge port 63, and a discharge port outlet 63b, from which the cooling current is sent out of the discharge port 63 toward the optical components. The discharge port inlet 63a is a duct side opening formed by the wall surfaces W1 and W2 of the discharge port 63. The discharge port outlet 63b is an optical component side opening formed by the wall surfaces W1 and W2 of the discharge port 63.

In the same manner as the discharge port 63, the discharge port 64 is formed by walls A1, A2, B1, and B2 and includes a discharge port inlet 64a, through which the cooling current from the cooling fan 72 is drawn in when entering the discharge port 64, and a discharge port outlet 64b, from which the cooling current is sent out of the discharge port 64 toward the optical components.

Figure 11:
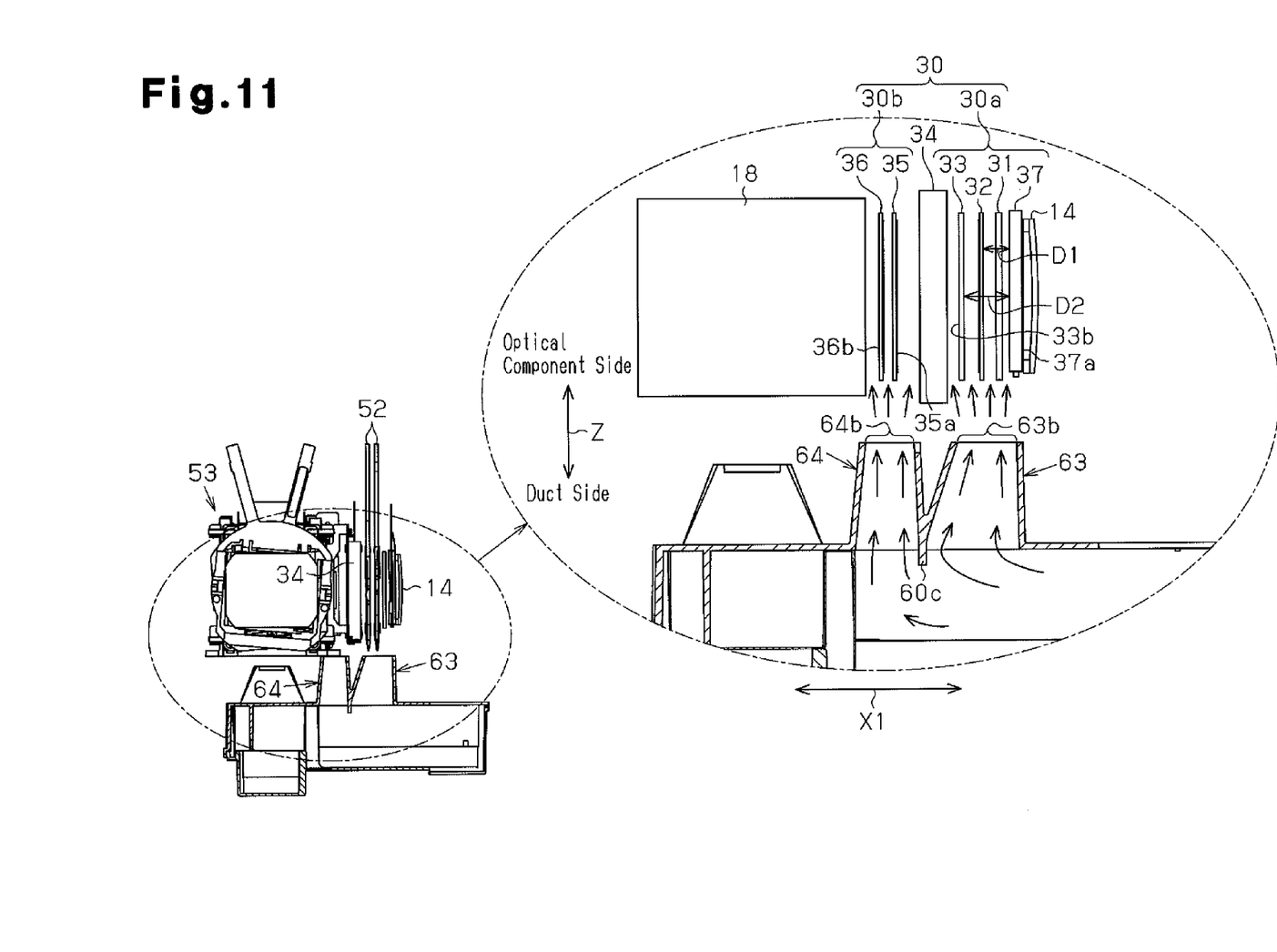
FIG. 11 is a diagram showing the optical components taken along line A-A in FIG. 8.

Referring to FIG. 11, the discharge ports 63 and 64 are arranged to send out the cooling current toward the liquid crystal light valve 30. More specifically, the discharge port 63 opens toward the incident side optical elements 30a, which forms the liquid crystal light valve 30, and the discharge port 64 opens toward the emission side optical elements 30b, which forms the liquid crystal light valve 30.

Referring to FIG. 6, the discharge ports 65 and 66 of the duct 60 are each formed by two walls A1 and A2, which are spaced apart and opposed to each other in an optical axis direction X2, and two walls B1 and B2, which connect the walls A1 and A2 and are opposed to each other in a lateral direction Y2. The optical axis direction X2 is the direction in which light is transmitted through the liquid crystal light valve 40, which is the optical component subject to which the air current is sent from the discharge ports 65 and 65. The lateral direction Y2 is perpendicular to the optical axis direction X2 and direction Z in which the cooling current circulates at the discharge ports 65 and 65.

The discharge ports 65 and 66 are formed in the same manner as the discharge ports 63 and 64. More specifically, referring to FIG. 10, the discharge port 65 includes a discharge port inlet 65a, through which the cooling current from the cooling fan 72 is drawn in when entering the discharge port 65, and a discharge port outlet 65b, from which the cooling current is sent out of the discharge port 65 toward the optical components. The discharge port 66 also includes a discharge port inlet 66a, through which the cooling current from the cooling fan 71 is drawn in when entering the discharge port 66, and a discharge port outlet 66b, from which the cooling current is sent out of the discharge port 66 toward the optical components.

Figure 12:
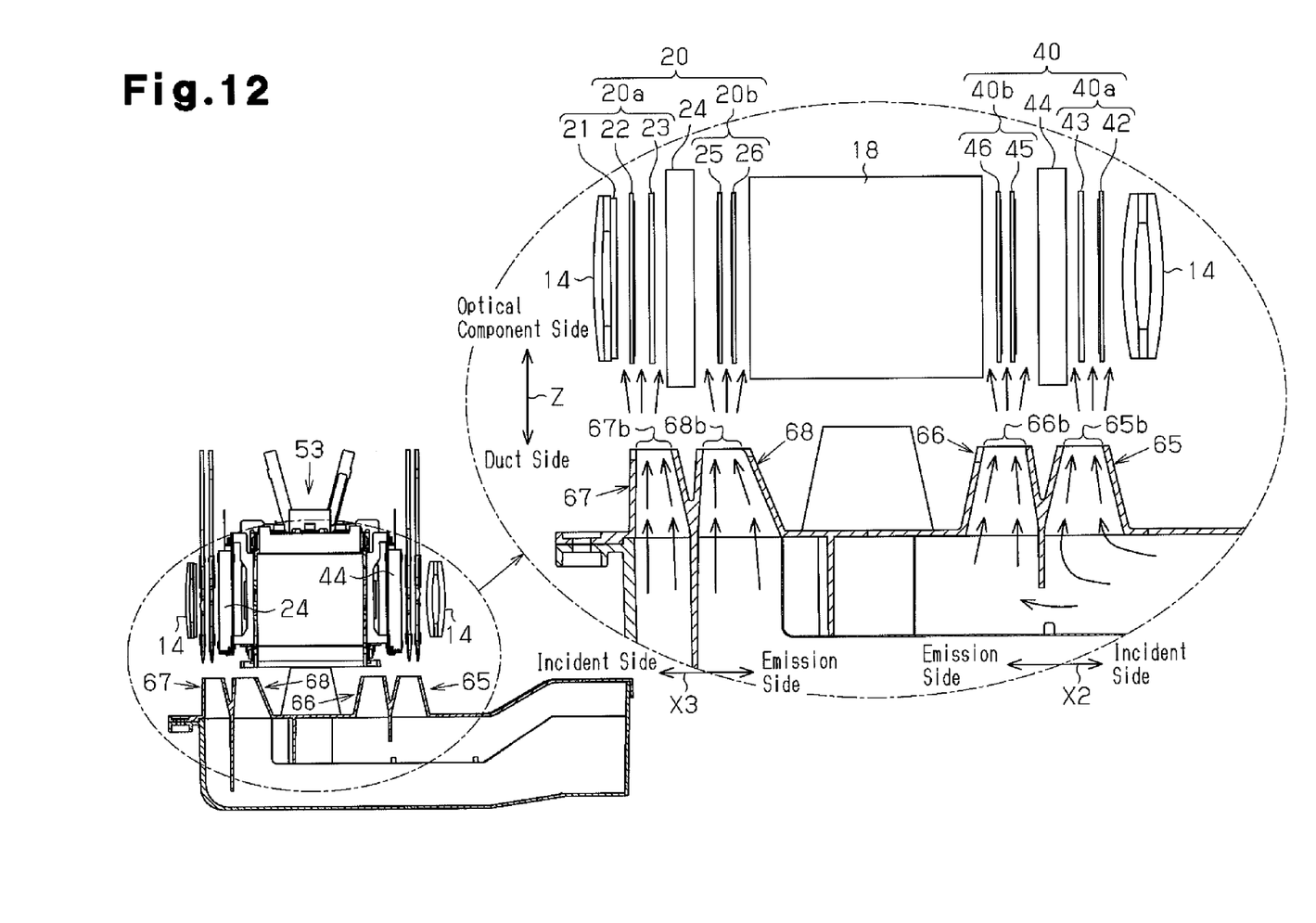
FIG. 12 is a diagram showing the optical components taken along line B-B in FIG. 8.

Referring to FIG. 12, the discharge ports 65 and 66 are arranged to send out the cooling current toward the liquid crystal light valve 40. More specifically, the discharge port 65 opens toward the incident side optical elements 40a, which forms the liquid crystal light valve 40, and the discharge port 66 opens toward the emission side optical elements 40b, which forms the liquid crystal light valve 40.

Referring to FIG. 6, the discharge ports 67 and 68 of the duct 60 are each formed by two walls A1 and A2, which are spaced apart and opposed to each other in an optical axis direction X3, and two walls B1 and B2, which connect the walls A1 and A2 and are opposed to each other in a lateral direction Y3. The optical axis direction X3 is the direction in which light is transmitted through the liquid crystal light valve 20, which is the optical component subject to which the air current is sent from the discharge ports 67 and 68. The lateral direction Y3 is perpendicular to the optical axis direction X3 and direction Z in which the cooling current circulates at the discharge ports 67 and 68.

The discharge ports 67 and 68 are formed in the same manner as the other discharge ports 63 to 66. More specifically, referring to FIG. 10, the discharge port 67 includes a discharge port inlet 67a, through which the cooling current from the cooling fan 71 is drawn in when entering the discharge port 67, and a discharge port outlet 67b, from which the cooling current is sent out of the discharge port 67 toward the optical components. The discharge port 68 also includes a discharge port inlet 68a, through which the cooling current from the cooling fan 71 is drawn in when entering the discharge port 68, and a discharge port outlet 68b, from which the cooling current is sent out of the discharge port 68 toward the optical components.

Referring to FIG. 12, the discharge ports 67 and 68 are arranged to send out the cooling current toward the liquid crystal light valve 20. More specifically, the discharge port 67 opens toward the incident side optical elements 20a, which form the liquid crystal light valve 20, and the discharge port 68 opens toward the emission side optical elements 20b, which form the liquid crystal light valve 20.

Referring to FIG. 9, the discharge port outlet 64b (i.e., the optical component side) of the discharge port 64 includes a cutout portion 64c. More specifically, the walls A2, B1, and B2 of the discharge port 64 project further from the wall A1 toward the optical components. This allows for adjustment of the direction of the cooling current that flows out of the discharge port outlet 64b without changing the position of the discharge port 64 in the duct 60. The discharge ports 66, 67, and 68 also include the same kind of cutout portion to adjust the direction of the cooling current that flows out of the discharge port outlets 66b, 67b, and 68b.

As described above, the LCD projector 1 includes the optical components (i.e., liquid crystal light valves 20, 30, and 40), which transmit light to display an image, the cooling fans 71 and 72, which generate the cooling current to cool the optical components, and the duct 60, through which the cooling current circulates. Further, the duct 60 includes the discharge ports 63 to 68, from which the cooling current is sent out toward the optical components. The discharge ports 63 to 68 respectively include the discharge port inlets 63a to 68a, through which the cooling current from the cooling fans 71 and 72 is drawn in, and the discharge port outlets 63b to 68b, from which the drawn in cooling current is sent out toward the optical components.

The present embodiment has a feature in which the discharge port 63 is formed so that the gap between the wall surfaces W1, which are opposed to each other in the optical axis direction X1, becomes narrower from the discharge port inlet 63a to the discharge port outlet 63b and so that the gap between the wall surfaces W2, which are opposed to each other in the lateral direction Y1, becomes narrower from the discharge port inlet 63a to the discharge port outlet 63b.

More specifically, in the optical axis direction X1, which is the direction in which light is transmitted through the liquid crystal light valve 30, the gap between the wall surface W1 of the wall A1 and the wall surface W1 of the wall A2 becomes narrower from the discharge port inlet 63a to the discharge port outlet 63b. Further, in the lateral direction Y1, which is perpendicular to the optical axis direction X1, the gap between the wall surface W2 of the wall B1 and the wall surface W2 of the wall 52 becomes narrower from the discharge port inlet 63a to the discharge port outlet 63b.

The discharge ports 64 to 68 are formed in the same manner as the discharge port 63. More specifically, in the discharge port 64, the gap between the wall surfaces W1, which are opposed to each other in the optical axis direction X1, becomes narrower from the discharge port inlet 64a to the discharge port outlet 64b, and the gap between the wall surfaces W2, which are opposed to each other in the lateral direction Y1, becomes narrower from the discharge port inlet 64a to the discharge port outlet 64b. In the discharge ports 65 and 66, the gap between the wall surfaces W1, which are opposed to each other in the optical axis direction X2, becomes narrower from the discharge port inlets 65a and 66a to the discharge port outlet 65b and 66b, and the gap between the wall surfaces W2, which are opposed to each other in the lateral direction Y2, becomes narrower from the discharge port inlets 65a and 66a to the discharge port outlets 65b and 66b. Further, in the discharge ports 67 and 68, the gap between the wall surfaces W1, which are opposed to each other in the optical axis direction X3, becomes narrower from the discharge port inlets 67a and 68a to the discharge port outlet 67b and 68b, and the gap between the wall surfaces W2, which are opposed to each other in the lateral direction Y3, becomes narrower from the discharge port inlets 67a and 67a to the discharge port outlets 67b and 68b.

Figure 13:
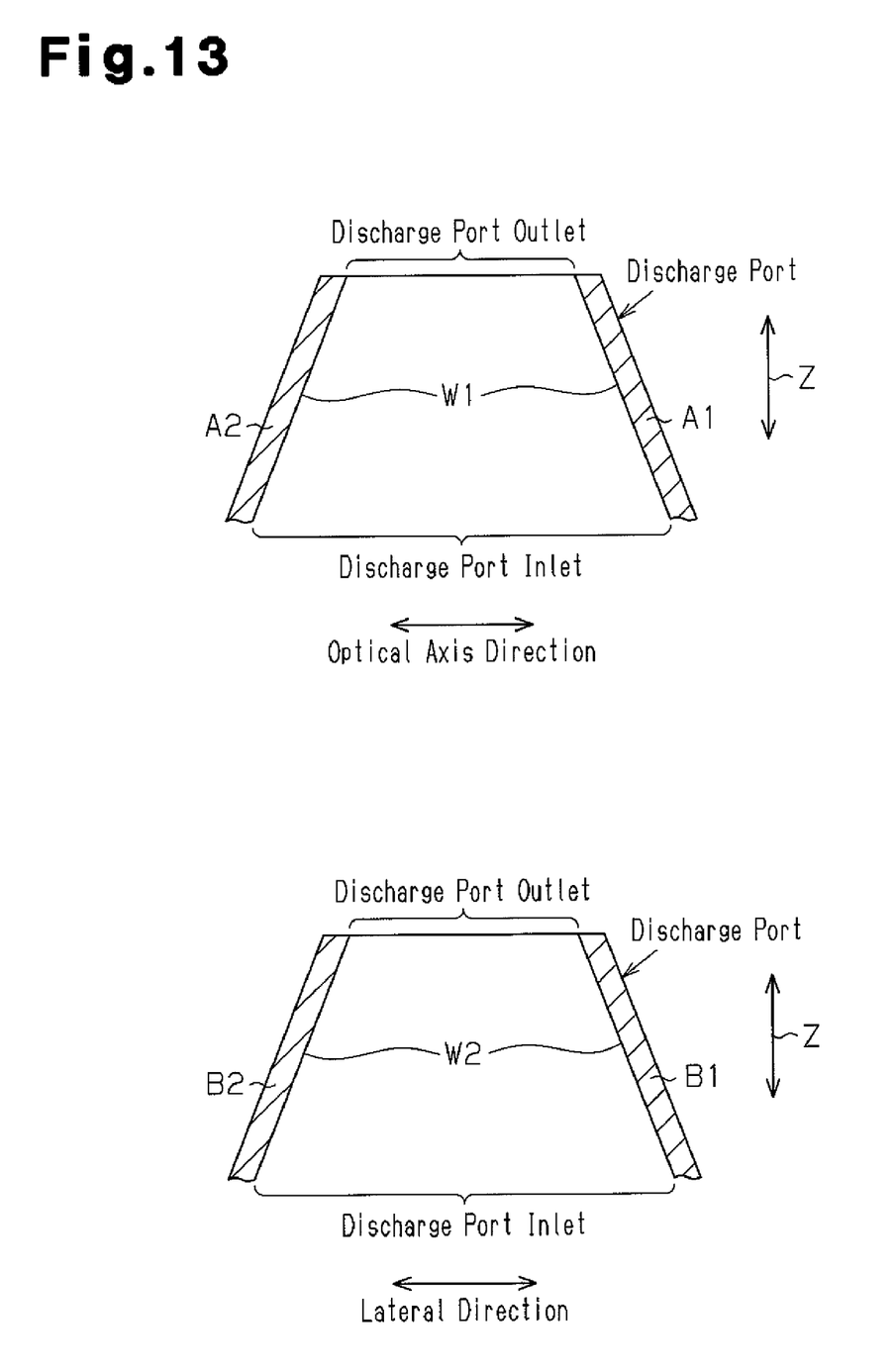
FIG. 13 is a schematic diagram showing the shape of a discharge port of the duct of FIG. 6.

As shown by the schematic diagram of FIG. 13, each of the discharge ports 63 to 68 are formed so that the gap between opposing wall surfaces becomes narrower in the optical axis direction and the lateral direction from the discharge port inlet to the discharge port outlet. This increases the velocity of the cooling current in each of the discharge ports 63 to 68. For example, in the discharge port 63, the velocity of the cooling current flowing out of the discharge port outlet 63b toward the incident side optical elements 30a increases.

In the present embodiment, the duct 60 includes the discharge port 63, from which the cooling current is sent out toward the incident side optical elements 30a, and the discharge port 64, from which the cooling current is sent out toward the emission side optical elements 30b. The discharge port 63 is arranged adjacent to the discharge port 64. The duct 60 also includes the discharge port 65, from which the cooling current is sent out toward the incident side optical elements 40a, and the discharge port 66, from which the cooling current is sent out toward the emission side optical elements 40b. The discharge port 65 is arranged adjacent to the discharge port 66. Further, the duct 60 includes the discharge port 67, from which the cooling current is sent out toward the incident side optical elements 20a, and the discharge port 68, from which the cooling current is sent out toward the emission side optical elements 20b. The discharge port 67 is arranged adjacent to the discharge port 68.

In the present embodiment, the incident side optical elements 30a includes the Ye modulation element 37, which adjusts the polarization state of the yellow light in accordance with the applied voltage, polarization plates (i.e., the inorganic polarization plate 31 and the incident polarization plate 32), into which the light transmitted through the Ye modulation element 37 enters, and the optical compensation plate 33, into which the light transmitted through the inorganic polarization plate 31 and the incident polarization plate 32 enters. Further, as shown in FIG. 11, the discharge port outlet 63b of the discharge port 63 has an opening that is larger in the optical axis direction X1 that the distance D1 between the Ye modulation element 37 and the incident polarization plate 32. Preferably, the discharge port outlet 63b is formed to be larger than the distance D2 between the Ye modulation element 37 and the optical compensation plate 33. This increases the amount of the cooling current sent out of the discharge port 63 toward the Ye modulation element 37, the inorganic polarization plate 31, the incident polarization plate 32, and the optical compensation plate 33.

Further, the opposing wall surfaces W1 of the discharge port 63 become narrower from the discharge port inlet 63a to the discharge port outlet 63b. In the optical axis direction X1, the discharge port inlet 63a of the discharge port 63 is larger than the width of the incident side optical elements 30a (i.e., the distance from the incident surface 37a of the Ye modulation element 37 to the emission surface 33b of the optical compensation plate 33). In the same manner, the discharge port inlet 64a of the discharge port 64 is larger than the width of the emission side optical elements 30b (i.e., the distance from the incident surface 35a of the pre-polarization plate 35 to the emission surface 36b of the emission polarization plate 36).

In the present embodiment, as shown in FIG. 9, in the direction in which the cooling current flows in the duct 60, the two discharge ports 63 and 64 are arranged adjacent to each other. Further, a projection 60c projects into the duct 60 between the discharge ports 63a and 64a. As a result, the cooling current that circulates through the duct 60 strikes the projection 60c so that the cooling current easily enters the discharge port inlet 63a of the discharge port 63, which is located at the upstream side with respect to the direction in which the cooling current flows.

As shown in FIG. 10, a projection 60d is arranged between the adjacent discharge port inlets 65a and 66a, and a projection 60e is arranged between the adjacent discharge port inlets 67a and 68a. Therefore, the cooling current that circulates through the duct 60 strikes the projections 60d and 60e so that the cooling current easily enters the discharge port inlets 65a and 68a of the discharge ports 65 and 68, which are located at the upstream side with respect to the direction in which the cooling current flows.

The LCD projector 1 of the present embodiment has the advantages described below.

(1) The discharge port 63 includes the two wall surfaces W1 and the two wall surfaces W2. The wall surfaces W1 are opposed to each other in the optical axis direction X1 in which light is transmitted through the liquid crystal light valve 30. The wall surfaces W2 are opposed to each other in the lateral direction Y1, which is perpendicular to the optical axis direction X1. In the discharge port 63, the gap between the wall surfaces W1 and the gap between the wall surfaces W2 become narrower from the discharge port inlet 63a to the discharge port outlet 63b. This increases the velocity of the cooling current that flows from the discharge port outlet 63b of the discharge port 63 toward the incident side optical elements 30a and thereby effectively cools the incident side optical elements 30a. This effectively cools the optical compensation plate 33, the incident polarization plate 32, the inorganic polarization plate 31, and the Ye modulation element 37, which is preferably spaced from the inorganic polarization plate 31 by a distance of one millimeter. Further, the discharge ports 64 to 68 also have the same structure. Thus, the velocity of the cooling currents that flow from the discharge port outlets 64b, 65b, 66b, 67b, and 68b toward the optical components is increased.

(2) The discharge port 63 is formed so that the gap between the wall surface W1 of the wall A1 and the wall surface W1 of the wall A2 and the gap between the wall surface W2 of the wall B1 and the wall surface W2 of the wall B2 become narrower from the discharge port inlet 63a to the discharge port outlet 63b. In other words, the discharge port 63 is formed to have a tetragonal cross-section so as to be box-shaped and includes the discharge port inlet 63a and the discharge port outlet 63b, the opening of which area is smaller than that of the opening of the discharge port inlet 63a. The shape of the discharge port 63 increases the velocity of the cooling current that flows from the discharge port outlet 63b of the discharge port 63 toward the incident side optical elements 30a. The discharge ports 64 to 68 also have the same structure and thereby have the same advantage.

(3) The discharge port 63, from which the cooling current is sent out toward the incident side optical elements 30a, is arranged adjacent to the discharge port 64, from which the cooling current is sent out toward the emission side optical elements 30b. Thus, the adjacent discharge ports 63 and 64 cool the incident side optical elements 30a and the emission side optical elements 30b that are arranged at opposite sides of the liquid crystal panel 34. In the same manner, the discharge ports 65 and 66 cool the incident side optical elements 40a and the emission side optical elements 40b that are arranged at opposite sides of the liquid crystal panel 44. Further, the discharge ports 67 and 68 cool the incident side optical elements 20a and the emission side optical elements 20b that are arranged at opposite sides of the liquid crystal panel 24.

(4) In the optical axis direction X1, the discharge port outlet 63b of the discharge port 63 has an opening with a width that is larger than the distance D2 between the Ye modulation element 37 and the optical compensation plate 33. This increases the amount of the cooling current sent out of the discharge port 63 toward the Ye modulation element 37, the inorganic polarization plate 31, the incident polarization plate 32, and the optical compensation plate 33. Thus, the incident side optical elements 30a are further effectively cooled.

(5) The projection 60c, which projects into the duct 60, is arranged between the discharge port inlet 63a of the discharge port 63 and the discharge port inlet 64a of the discharge port 64. Thus, the cooling current easily enters the discharge port inlet 63a of the discharge port 63 and increases the amount of the cooling current sent toward the incident side optical element 30a. This further effectively cools the incident side optical elements 30a. The projections 60d and 60e are also respectively arranged between the discharge port inlets 65a and 66a and between the discharge port inlets 67a and 68a. The projections 60d and 60e function in the same manner as the projection 60c.

(6) The projections 60c, 60d, and 60e are formed in part of the duct 60. Thus, the projections 60c, 60d, and 60e require only the duct 60 and do not require other components.

It should be apparent to those skilled in the art that the present invention may be embodied in many other specific forms without departing from the spirit or scope of the invention. Particularly, it should be understood that the present invention may be embodied in the following forms.

In the above-described embodiment, the projections 60c, 60d, and 60e are formed in the duct 60. However, a component other than the duct 60 may be used to form the projections 60c, 60d, and 60e so that they are detachably attached to the duct 60.

In each of the above-described embodiments, the discharge port outlet 63b of the discharge port 63 has an opening with a width in the optical axis direction X1 that is larger than the distance D2 between the Ye modulation element 37 and the optical compensation plate 33. However, the size of the discharge port outlet 63b may be changed when necessary.

For example, in the optical axis direction X1, the opening width of the discharge port outlet 63b may be smaller than the distance D2 between the Ye modulation element 37 and the optical compensation plate 33 but larger than the distance D1 between the Ye modulation element 37 and the incident polarization plate 32. Such a structure would also increase the amount of cooling current sent out of the discharge port 63 toward the Ye modulation element 37, the inorganic polarization plate 31, and the incident polarization plate 32.

In each of the above-described embodiments, the discharge port 63 sends out the cooling current toward the incident side optical elements 30a, and the discharge port 64 sends out the cooling current toward the emission side optical elements 30b. However, the cooling current may be sent out toward other optical components. More specifically, the quantity and location of the discharge ports of the duct 60 may be changed as required so that, for example, the duct 60 has a single discharge port that sends out the cooling current toward the incident side optical elements 30a and the emission side optical elements 30b. In this case, a single discharge port having the same structure as the discharge port 63 or 64 is arranged in the region in which the incident side optical elements 30a and the emission side optical elements 30b are located.

In each of the above-described embodiments, the projection formed from the two opposed walls A1 and A2 and the two opposed walls B1 and B2 are formed to have a tetragonal cross-section. However, the projection is not required to have a tetragonal cross-section.

In each of the above-described embodiments, the present invention is applied to the LCD projector 1. However, the present invention may also be applied to other types of video projectors. In such a case, the advantages of the above-described embodiments would also be obtained.

The present examples and embodiments are to be considered as illustrative and not restrictive, and the invention is not to be limited to the details given herein, but may be modified within the scope and equivalence of the appended claims.

What is claimed is:

1. A video projector comprising:
    an optical component which transmits light to display an image;
    a cooling fan which generates a cooling current to cool the optical component; and
    a duct through which the cooling current circulates, with the duct including a first discharge port, and the first discharge port including:
    first and second wall surfaces opposed to each other in an optical axis direction in which the light is transmitted through the optical component;
    third and fourth wall surfaces opposed to each other in a lateral direction which is perpendicular to the optical axis direction;
    a discharge port inlet that is a duct side opening into which the cooling current from the cooling fan is drawn in a direction perpendicular to each of the optical axis direction and the lateral direction; and
    a discharge port outlet that is an optical component side opening from which the cooling current is sent toward the optical component in the direction perpendicular to each of the optical axis direction and the lateral direction, wherein
    the first to fourth wall surfaces of the first discharge port extend from the discharge port inlet to the discharge port outlet, and
    the first and second wall surfaces are spaced apart by a gap and the third and fourth wall surfaces are spaced apart by a gap, with the gaps becoming narrower from the discharge port inlet to the discharge port outlet.

2. The video projector according to claim 1, wherein the first discharge port includes:
    a first wall having the first wall surface;
    a second wall having the second wall surface and opposed to the first wall;
    a third wall having the third wall surface; and
    a fourth wall having the fourth wall surface and opposed to the third wall;
    wherein the third and fourth walls connect the first and second walls so that the gap between the first and second wall surfaces and the gap between the third and fourth wall surfaces become narrower from the discharge port inlet to the discharge port outlet.

3. The video projector according to claim 1, wherein the optical component includes:
    a liquid crystal panel which forms a light valve;
    an incident side optical element arranged at an incident side of the liquid crystal panel from which light enters; and
    an emission side optical element arranged at an emission side of the liquid crystal panel from which light exits, in which the first discharge port sends out the cooling current toward the incident side optical element and the emission side optical element.

4. The video projector according to claim 1, wherein the optical component includes:
    a liquid crystal panel which forms a light valve;
    an incident side optical element arranged at an incident side of the liquid crystal panel from which light enters; and
    an emission side optical element arranged at an emission side of the liquid crystal panel from which light exits, in which the first discharge port sends out the cooling current toward the incident side optical element;
    the video projector further comprising:
    a second discharge port which sends out the cooling current toward the emission side optical element, in which the first and second discharge ports are arranged adjacent to each other.

5. The video projector according to claim 4, wherein the incident side optical element includes:
    an adjustment element which adjusts a polarization state of the light in accordance with a voltage that is applied to the adjustment element; and
    a polarization plate into which the light that has been transmitted through the adjustment element enters, with the discharge port outlet of the first discharge port having an opening width that is larger than the distance between the adjustment element and the polarization plate in the optical axis direction.

6. The video projector according to claim 5, wherein the incident side optical element further includes:
    an optical compensation plate into which the light that has been transmitted through the polarization plate enters, with the opening width of the discharge port outlet being larger than the distance between the adjustment element and the optical compensation plate in the optical axis direction.

7. The video projector according to claim 4, wherein;
    the first discharge port and the second discharge port are arranged adjacent to each other in the duct in a direction in which the cooling current flows; and
    the duct further includes a projection projecting into the duct between the first and second discharge ports.

8. The video projector according to claim 7, wherein the projection is formed integrally with part of the duct.

* * * * *